United States Patent [19]

Uchiyama et al.

[11] Patent Number: 5,325,351
[45] Date of Patent: Jun. 28, 1994

[54] OPTICAL RECORDING MEDIUM HAVING A REFLECTIVE LAYER MADE OF CU-AG OR CU-AU ALLOY

[75] Inventors: Kenji Uchiyama, Nagano; Mamoru Usami, Saku, both of Japan

[73] Assignee: TDK Corporation, Tokyo, Japan

[21] Appl. No.: 779,184

[22] Filed: Oct. 21, 1991

[30] Foreign Application Priority Data

| Oct. 22, 1990 | [JP] | Japan | 2-284085 |
| Oct. 22, 1990 | [JP] | Japan | 2-284086 |
| Nov. 30, 1990 | [JP] | Japan | 2-334920 |
| Jul. 10, 1991 | [JP] | Japan | 3-287006 |

[51] Int. Cl.$^5$ .................. G11B 7/26; G11B 7/24
[52] U.S. Cl. .................. 369/275.1; 369/283; 369/288; 428/64; 428/65; 428/913; 430/495; 430/945
[58] Field of Search .......... 369/275.1–275.4, 369/275.5, 283, 284, 286, 288; 428/64, 65, 913, 411.1, 457; 430/495, 494, 945

[56] References Cited

U.S. PATENT DOCUMENTS

| 4,866,672 | 9/1989 | Terao et al. | 369/288 |
| 4,994,352 | 2/1991 | Strandjord et al. | 430/495 |
| 5,161,150 | 11/1992 | Namba et al. | 369/275.4 |
| 5,208,088 | 5/1993 | Tominaga et al. | 428/64 |
| 5,215,798 | 6/1993 | Hirata et al. | 428/64 |

FOREIGN PATENT DOCUMENTS

| 2-79235 | 3/1990 | Japan. |
| 2-87341 | 3/1990 | Japan. |

OTHER PUBLICATIONS

Nikkei Electronics; Jan. 23, 1989 (No. 465); p. 107.
The Functional Dye Department of the Kinki Chemical Society, Mar. 3, 1989, p. 1520.
SPIE vol. 1078, Optical Recording Topical Meeting (1989); pp. 80–87.

*Primary Examiner*—Paul M. Dzierzynski
*Assistant Examiner*—Kim-Kwok Chu
*Attorney, Agent, or Firm*—Watson, Cole, Grindle & Watson

[57] ABSTRACT

In an optical recording medium comprising a recording layer on a substrate, a reflective layer in the form of a Cu-Ag or Cu-Au alloy thin film is formed on the recording layer. The Cu-Ag alloy contains 5–40 atom% of Ag and the Cu-Au alloy contains 5–99 atom% of Au. The reflective layer has enough high reflectivity, corrosion resistance, and hardness to provide optical recording medium with improved eye pattern, minimized jitter and minimized error rate.

19 Claims, 3 Drawing Sheets $Cu_{65}Ag_{35}$

TIME →

Au

TIME →

OPTICAL RECORDING MEDIUM HAVING A REFLECTIVE LAYER MADE OF CU-AG OR CU-AU ALLOY

FIELD OF THE INVENTION

This invention relates to an optical recording medium having a recording layer on a substrate, and more particularly, to an optical recording medium of the write-once type intended for compact disks.

BACKGROUND OF THE INVENTION

Additionally or fully recordable optical recording disks of the type having recording and reflective layers on a substrate were proposed in accordance with the compact disk (generally known as CD) standard See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.

This type of disk has a dye layer, a reflective Au layer, and a protective layer disposed on a transparent resin substrate in this order. That is, the reflective layer is in close contact with the dye layer. As opposed to the prior art disk of the air sandwich structure wherein an air layer is provided on a dye layer of the disk in order to allow pits to be formed in the dye layer, the newly proposed disk is of the close contact type wherein the reflective layer is close to the dye layer. The close contact type configuration could meet the total disk thickness of 1.2 mm required by the CD standard.

In the medium of the close contact type wherein a reflective layer is close to a recording layer containing a dye, the recording layer should have a reflectivity of at least 60% with respect to the recording and reproducing light, especially at least 70% in the case of the CD standard. To this end, a gold thin film having high reflectivity and corrosion resistance is used as the reflective layer as disclosed in Japanese Patent Application Kokai No. 79235/1990.

However, the gold thin film has several problems. First, gold is soft. The gold thin film on the recording layer can be deformed by thermal expansion of the recording layer when pits are formed therein by directing recording light to the recording layer. This results in a disturbed eye pattern as reproduced output waveform and increased jitter.

Secondly, gold is expensive. It was proposed to use thin films of silver, copper and other less expensive metals as the reflective layer. For example, Japanese Patent Application Kokai Nos. 79235/1990 and 87341/1990 discloses thin films of Ag and Cu as the reflective layer. The Ag and Cu thin films provide a reflectivity of about 70% as deposited, which is gradually lost due to poor corrosion resistance. Acceptable reflectivity is not available with thin films of metals other than Ag and Cu, for example, aluminum thin films. Therefore, optical recording disks having thin films of metals other than Au as the reflective layer are increased in error rate and thus impractical.

SUMMARY OF THE INVENTION

Therefore, an object of the present invention is to provide a novel and improved optical recording medium having a reflective layer with high reflectivity and corrosion resistance so that the medium is minimized in eye pattern disturbance, jitter, and error rate for obtaining satisfactory recording and reproduction.

According to the present invention, there is provided an optical recording medium comprising a substrate, a recording layer on the substrate, and a reflective layer on the recording layer. In one form of the invention, the reflective layer is a thin film of an alloy comprising Cu and less than 40 atom% of Ag. Preferred is an alloy thin film consisting essentially of Cu and 5 atom% to less than 40 atom% of Ag. Part of the copper may be replaced by zinc.

In another form of the invention, the reflective layer is a thin film of an alloy comprising Cu and Au. Preferred is an alloy thin film consisting essentially of Cu and 5 to 99 atom% of Au. Also part of the copper may be replaced by zinc or silver.

In a preferred embodiment, the recording layer contains a light absorbing dye, and the reflective layer is disposed in close contact with the recording layer, wherein information is recorded and reproduced by directing recording light to the recording layer to form pits therein and directing reproducing light thereto. The recording and reproducing light normally has a wavelength in the range of from 600 to 900 nm.

Further preferably, the recording layer includes an unrecorded portion having a reflectivity of at least 60% and a recorded portion having a reflectivity which is up to 60% of the reflectivity of the unrecorded portion when reproducing light is directed from the substrate side. The recording layer has a coefficient of extinction k of 0.01 to 0.25 and an index of refraction n of 1.8 to 4.0 at the wavelength of the recording and reproducing light.

In practice, a layer which contains decomposition products of the material of which the recording layer is formed, but is substantially free of the material of which the substrate is formed is present at the interface between the substrate and the recording layer where the pits are formed. A space is formed adjacent each of the pits.

A protective film having a pencil hardness of H to 8H at 25° C. may be provided on the reflective layer.

ADVANTAGES

In accordance with the present invention, the optical recording medium uses an alloy thin film as the reflective layer which has high reflectivity and corrosion resistance. The optical recording medium is thus minimized in error rate for obtaining satisfactory recording and reproduction.

In one preferred embodiment of the close contact type wherein the reflective layer is disposed in close contact with the recording layer, the reflective layer is hard enough to resist deformation despite thermal expansion of the recording layer when pits are formed therein by directing recording light to the recording layer. The medium can thus avoid any eye pattern disturbance and jitter increase.

Japanese Patent Application Kokai No. 18624/1982 discloses an optical reading information disk having on a substrate a reflective layer in the form of an Ag-Cu alloy thin film containing more than 40 atom% of Ag. No problem arises with the reflective layer since this optical reading information disk is a read only disk free of a recording layer. The Ag-Cu alloy thin films containing more than 40 atom% of Ag, however, are not hard enough as the reflective layer for optical recording media. In optical recording media of the close contact type wherein the reflective layer is disposed in close contact with the recording layer, such a silver-rich reflective layer is soft enough to allow deformation by thermal expansion of the recording layer when pits are formed therein by directing recording light to the recording layer. This results in a disordered eye pattern and increased jitter.

According to the present invention, by limiting the Ag content of Cu-Ag alloy thin film to less than 40 atom%, a reflective layer of sufficient hardness is obtained.

DESCRIPTION OF THE PREFERRED EMBODIMENTS

The optical recording medium of the present invention includes a recording layer on a substrate and a reflective layer on the recording layer. The recording layer is not particularly limited insofar as information can be subsequently recorded therein.

Figure 1:
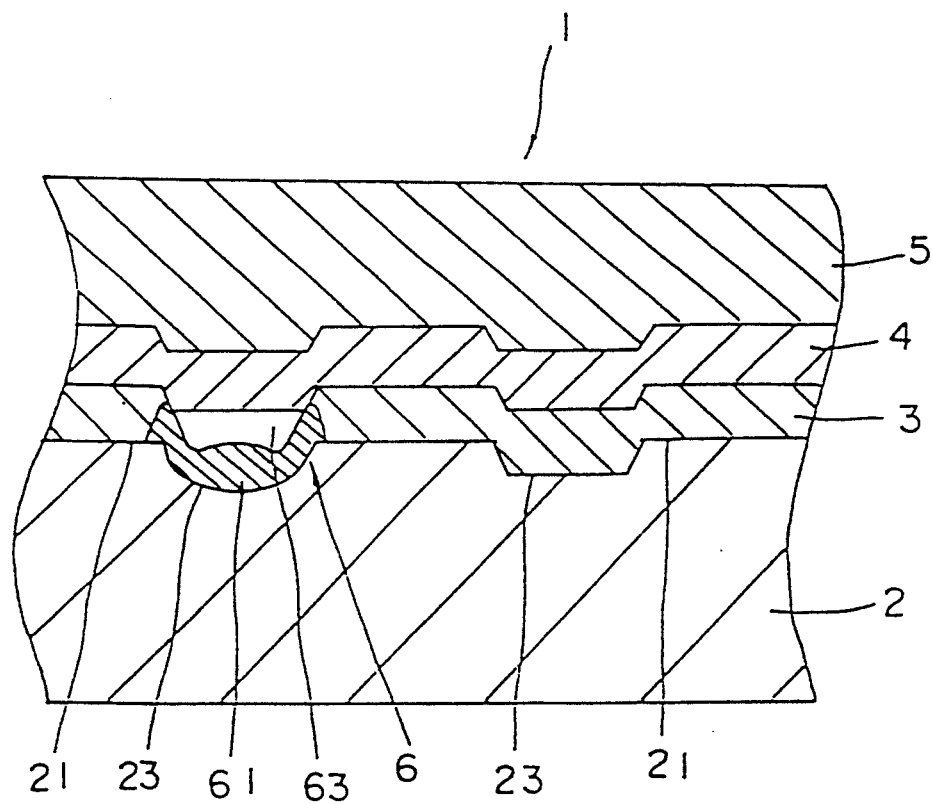
FIG. 1 is a fragmental cross-sectional view of an optical recording disk according to one preferred embodiment of the invention.

Referring to FIG. 1, there is illustrated in cross section a portion of an optical recording medium generally designated at 1 according to one preferred embodiment of the invention. The medium 1 is an optical recording disk of the close contact type including a substrate 2, a dye-containing recording layer 3 on the substrate, and a reflective layer 4 and a protective layer 5 on the recording layer 3 in close arrangement.

Substrate

The substrate 2 is of conventional disk shape and has commonly used dimensions, for example, a thickness of about 1.2 mm and a diameter of about 80 or 120 mm according to the CD standard.

The substrate 2 is formed of a resin or glass material which is substantially transparent to recording and reproducing light, typically a semiconductor laser beam having a wavelength of 600 to 900 nm, especially 700 to 800 nm, most often 780 nm. The substrate material preferably has a transmittance of at least 80% so that recording and reproducing operation can be made through the substrate 2, that is, from the rear surface of the substrate 2 remote from the recording layer 3.

Preferably, the substrate 2 is formed of resins, typically thermoplastic resins such as polycarbonate resin, acrylic resins, amorphous polyolefins, and TPX.

If desired, the substrate may be formed with an oxygen-impermeable coating on at least one of its upper and lower surfaces and optionally, on the inner and outer periphery surfaces.

On the surface of the substrate 2 where the recording layer 3 is formed, the upper surface in the illustrated embodiment, a groove 23 is formed for tracking purposes. The tracking groove 23 preferably consists of continuous spiral turns. Typically, the groove 23 has a depth of 250 to 1800 Å and a width of 0.2 to 1.1 μm, preferably 0.3 to 0.6 μm (width in a radial direction with respect to the disk center). The adjoining turns 23 are separated by a land 21 at a pitch of 0.5 to 1.4 μm, preferably 1.0 to 1.3 μm. With this groove configuration, tracking signals can be obtained without reducing the reflection level of the groove. The groove may be provided with recesses or projections for addressing signals.

Where the groove is formed in the surface of the substrate, a provision is preferably made such that recording light is directed to a recording layer within the groove. That is, the optical recording medium of the invention is preferably of the groove recording mode. The groove recording mode allows the recording layer to have an increased effective thickness.

Alternatively, a resin layer (not shown) may be formed on the substrate by 2P method or the like and provided with a predetermined pattern including tracking grooves and addressing signal recesses or projections. Such an undercoat may be formed from any desired resinous material selected from well-known resinous materials adapted for the 2P method, typically radiation curable compounds.

RECORDING LAYER

The recording layer 3 is formed on the grooved substrate 2 using a light absorbing dye or a mixture of compatible dyes. A light absorbing dye may be mixed with a quencher. Also a photo-stabilized dye, that is, an ionic combination or ionically bonded compound of a dye cation and a quencher anion is a useful light absorbing dye.

Preferably, the recording layer 3 has a coefficient of extinction (the imaginary part of a complex index of refraction) k of from 0.01 to 0.25, more preferably 0.03 to 0.25 at the wavelength of recording and reproducing light. With a coefficient of extinction k of less than 0.01, the recording layer can have a lower absorptivity so that it might become difficult to record with a commonly used power. A coefficient of extinction k of more than 0.25 can result in a drop of reflectivity to below 60%, often failing to reproduce according to the CD standard. Better results are obtained with k=0.04 to 0.20, especially 0.05 to 0.15.

The recording layer preferably has an index of refraction (the real part of a complex index of refraction) n of from 1.8 to 4.0, more preferably 2.2 to 3.3 at the wavelength of recording and reproducing light. With n<1.8, the reflectivity and reproduced signal therewith would be reduced, often failing to reproduce according to the CD standard. Few dyes have n>4.0.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168–178.

The light absorbing dyes used herein preferably have maximum absorption at a wavelength in the range of from 600 to 900 nm, more preferably form 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. Preferred are the cyanine dyes, typically cyanine dyes having an indolenine ring, especially a benzoindolenine ring.

In the practice of the invention, the recording layer 3 is often formed by coating a solution of the dye in a suitable solvent or by evaporation.

On the land 21 between the grooves 23 the recording layer 3 has a thickness of about 500 to about 2,000 Å. The recording layer 3 is generally thicker in the groove 23. Outside the range, the reflectivity would become too low to provide reproduction in accordance with the CD standard.

REFLECTIVE LAYER

The reflective layer 4 is applied to the recording layer 3 in direct contact therewith.

In the first form of the present invention, the reflective layer is a thin film of a cooper-silver alloy. This alloy thin film not only has high reflectivity, but is also significantly improved in corrosion resistance over conventional Cu and Ag thin films and in film hardness over conventional Au thin films.

The Ag content in the reflective layer is limited to less than 40 atom%. Cu-Ag alloy thin films containing 40 atom% or more of Ag are relatively soft, allowing the reflective layer 4 to be deformed by thermal expansion of the recording layer 3 when pits 6 are formed therein by directing recording light to the recording layer 3 (see FIG. 1) and accordingly, resulting in a distorted eye pattern and jitter increase. Cu-Ag alloy thin films with a too low Ag content would be less resistant against corrosion. If the disk were used or stored in a high-temperature, high-humidity environment for a long time, for example, the film would lose its reflectivity, resulting in increased errors. Additionally, Cu in the reflective layer becomes more liable to diffuse into the recording layer, adversely affecting the dye contained therein.

For these reasons, the upper limit of the Ag content in the reflective layer is preferably 38 atom%, more preferably 36 atom%, most preferably 35 atom% , and the lower limit of the Ag content in the reflective layer is preferably 5 atom%, more preferably 6 atom%, further preferably 8 atom%, most preferably 10 atom%.

For the Cu-Ag alloy, it is possible to partially substitute Zn, Ni, or Cd for the Cu. In practice, Zn, Ni, and Cd can substitute for up to 40 atom% , up to 10 atom%, and up to 40 atom% of the Cu, respectively. A typical example is a Cu-Ag-Zn alloy.

In the second form of the present invention, the reflective layer is a thin film of a copper-gold alloy. This alloy thin film not only has high reflectivity, but is also significantly improved in corrosion resistance over conventional Cu and Ag thin films and in film hardness over conventional Au thin films.

Preferably, the Au content in the reflective layer ranges from 5 to 99 atom%. Cu-Au alloy thin films containing more than 99 atom% of Au are approximate to gold itself and thus relatively soft, allowing the reflective layer 4 to be deformed by thermal expansion of the recording layer 3 when pits 6 are formed therein by directing recording light to the recording layer 3 (see FIG. 1) and accordingly, resulting in a distorted eye pattern and jitter increase. Cu-Au alloy thin films with less than 5 atom% of Au would be less resistant against corrosion. If the disk were used or stored in a high-temperature, high-humidity environment for a long time, for example, the film would lose its reflectivity, resulting in increased errors. Additionally, Cu in the reflective layer becomes unrestrained from diffusing into the recording layer, adversely affecting the dye contained therein.

For these reasons, the desirable upper limit of the Au Q content in the reflective layer is 80 atom%, more preferably 70 atom%, further preferably 60 atom%, still further preferably 50 atom%, most preferably 40 atom% , and the lower limit of the Au content in the reflective layer is preferably 6 atom%, more preferably 8 atom%, most preferably 10 atom%.

For the Cu-Au alloy, it is possible to partially substitute Zn, Ni, Cd or Ag for the Cu. In practice, Zn, Cd, or Ag can substitute for up to 40 atom% of the Cu and Ni can substitute for up to 10 atom% of the Cu. A typical example is a Cu-Au-Zn alloy.

The reflective layer 4 preferably has a thickness of at least about 500 Å. It can be formed by evaporation or sputtering. Although no upper limit is generally imposed on the thickness of the reflective layer, a thickness of up to about 1,200 Å is preferred for manufacturing cost and time. The reflective layer alone has a reflectivity of at least 90%, so that the reflectivity of an unrecorded portion of the medium through the substrate can be at least 60% , especially at least 70% .

PROTECTIVE LAYER

The protective layer 5 may be formed on the reflective layer 4. The protective layer may be formed from any desired resin material such as a UV-curable resin, usually to a thickness of about 0.1 to about 100 μm. The protective layer may be either a layer or a sheet.

The protective layer is preferably prepared by coating a composition of a radiation-curable compound and a photopolymerization sensitizer and curing the coating with radiation.

Preferably, the protective layer has a hardness in the range of H to 8H, especially 2H to 7H in pencil hardness at 25° C. according to JIS K-5400. This hardness range leads to an improved eye pattern and a substantial reduction of jitter. In addition, the protective layer will not separate from the underlying reflective layer during shelf storage under high-temperature, high-humidity conditions or varying temperature and humidity conditions. More specifically, the eye pattern can be disturbed and the jitter can increase if the protective layer is softer than pencil hardness H. A protective layer harder than 8H becomes brittle and difficult to form or would not fully adhere to the underlying reflective layer.

The radiation curable compounds used in forming the protective layer include oligoester acrylates. The oligoester acrylates are oligoester compounds having at least two acrylate or methacrylate groups. Preferred oligoester acrylates have a molecular weight of 1,000 to 10,000 , more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups. In addition to or instead of the oligoester acrylates, there may be used radiation-curable compounds in the form of thermoplastic resins modified to be radiation sensitive.

The protective layer of such a radiation-curable compound preferably has a thickness of from about 0.1 to 30 μm, more preferably from about 1 to 10 μm. A protective layer of thinner than 0.1 μm is often difficult to form uniformly and insufficient as a moisture barrier in a humid atmosphere so that the underlying recording layer becomes less durable. Jitter prevention also becomes insufficient. A protective layer thicker than 30 μm tends to invite distortion of the overall recording medium and cracking of the protective layer itself due to shrinkage upon curing.

The protective layer may be formed by any desired well-known technique, for example, spin coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred. For UV curing, a photopolymerization sensitizer is generally added to the radiation-curable compounds. As the photopolymerization sensitizer, any well-known compounds may be used, for example, benzoins such as benzoin methyl ether, benzoin ethyl ether, α-methylbenzoin, and α-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and mercury discharge lamps are used. If desired, electron radiation may be used.

Operation

Recording or additional recording may be carried out on the optical recording medium 1 of the above-described construction by directing recording light having a wave-length of 780 nm, for example, in pulse form to the recording layer 3 in the groove 23 through the substrate 2 to form a pit 6. The recording layer 3 absorbs light so that it is heated while the substrate 2 is heated at the same time. As a result, the recording material, typically dye melts or decomposes near the interface between the substrate 2 and the recording layer 3, applying a pressure to the interface between the substrate 2 and the recording layer 3 to deform the side walls of the groove 23.

The melted or decomposed products of the recording material leave a mass 61 on the bottom of the groove 23. Since the decomposed mass 61 somewhat invades the substrate side so that the pit 6 is larger in dimensions than the originally confined geometry of the recording layer. The decomposed mass 61 consists essentially of the decomposed Q product of the recording material or a mixture of the decomposed product of the recording material and the recording material, but does not substantially contain the substrate material. Typically, the decomposed mass 61 has a thickness of about 30 to about 90% of the thickness of the recording layer 3.

The pit 6 generally includes an empty space 63 which is formed above the decomposed layer 61 and at the interface between the original recording layer 3 and the reflective layer 4. The space 63 generally has a thickness of about 10 to about 70% of the thickness of the recording layer 3. Therefore, the pit 6 consists of the decomposed layer 61 and the space 63.

During the recording step described above, the substrate 2 does not undergo deformation in some cases, but in most cases, the substrate 2 is depressed into a recess at the pit 6 under the pressure induced upon heating. The depression of the substrate 2 is increased with the size of the pit 6 and is generally 0 to 300 Å deep.

In some cases, a fraction of the recording material or its decomposed product in an extremely thin film form can remain adhered to the reflective layer 4 above the space 63.

In this way, the layer 61 substantially free of the substrate material is formed in the pit 6 at the interface between the substrate 2 and the recording layer 3.

It is to be noted that the recording light has a power of about 5 to 9 mW while the substrate is rotated at a linear velocity of about 1.2 to 1.4 m/sec.

After the recorded sites or pits 6 are formed in this way, reproducing light having a wavelength of 780 nm and a power of about 0.1 to 1.0 mW is directed to the pits 6 through the substrate 2. The pits cause a phase difference to reduce the reflectivity to not greater than 60%, preferably not greater than 50%, more preferably not greater than 40% of the reflectivity of unrecorded portions. In turn, the remaining recording layer, that is, the unrecorded portions maintain a high reflectivity of at least 60%, especially at least 70%. This differential reflectivity enables reproduction according to the CD standard.

Although an optical disk has been described as a typical embodiment of the optical recording medium of the present invention, the present invention is also applicable to magneto-optical recording media in which information is magnetically recorded using a modulated thermal beam or modulated magnetic field and the recorded information is reproduced through magneto-optical conversion. In such a case, the recording layer is prepared from any desired material which enables magneto-optical recording, for example, alloys containing rare earth elements, especially rare earth element-transition metal alloys by sputtering, evaporating or ion plating them to form amorphous films.

The reflective layer as used herein can also be applied to read-only optical reproducing media having information previously carried thereon, for example, optical video disks and compact disks although the preferred form is an optical recording medium having a reflective layer deposited close to a dye-containing recording layer.

EXAMPLE

Examples of the present invention are given below by way of illustration and not by way of limitation.

EXAMPLE 1

An optical recording disk sample No. 1 was prepared by starting with a polyolefin resin substrate having a continuous spiral groove and a diameter of 120 mm and a thickness of 1.2 mm, forming a recording layer containing a dye thereon, sputtering a Cu-Ag alloy on the recording layer to form a reflective layer of 1,000 Å thick, and further applying a UV-curable resin composition containing an oligoester acrylate on the reflective layer, followed by UV curing to form a protective layer of 5 μm thick.

The dye used to form the recording layer has the following structural formula.

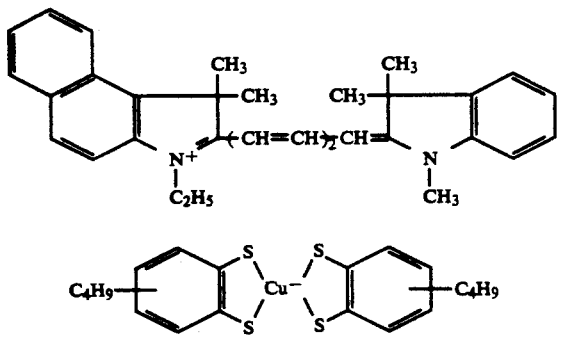

The recording layer was formed by spin coating a solution containing 5.0 wt% of the dye in cyclohexanone while the substrate was rotated at 500 to 3,000 r.p.m. At the end of drying, the recording layer was 2,800 Å thick in the groove and 1,800 Å thick on the land. It had an index of refraction (n) of 2.3 and a coefficient of extinction (k) of 0.03.

The index of refraction (n) and coefficient of extinction (k) of the recording layer were determined by applying a solution of a dye onto a test substrate to a dry thickness of 1,000 Å and measuring the n and k of the resulting recording layer. The measurement was made according to K. Ishiguro, "Optics," Kyoritsu Publishing K.K., pages 168-178. In the measurement of the recording dye layer, the solvent was cyclohexanone and the test substrate was a polyolefin substrate.

The reflective layer was a Cu-Ag alloy thin film of the composition $Cu_{65}Ag_{35}$ in atom% which was formed by sputtering the alloy under a pressure of 1.0 Pa with an input power of 11.0 W/cm$^2$. The composition of the Cu-Ag alloy thin film was analyzed by inductively coupled radio-frequency plasma spectroscopy.

The protective layer was formed by spin coating a coating composition containing a radiation-curable compound and a photopolymerization sensitizer. That is, the coating composition contained 100 parts by weight of a polyfunctional oligoester acrylate consisting of 30% by weight of trifunctional or more oligoester acrylate and 70% by weight of trimethylpropane acrylate available as Aronix M-8030 from Toa Synthesis K.K. and 5 parts by weight of a photopolymerization sensitizer available as IRGACURE 907 from Japan Ciba Geigy K.K.

The coating was exposed to UV radiation at 120 W/cm for 15 seconds, thereby crosslinking and curing the coating into a cured film having a pencil hardness of 2H and a thickness of 5 μm. In this way, an optical recording disk sample designated No. 1 was completed.

Sample Nos. 2 to 6 were prepared by the same procedure as No. 1 except that the reflective layer was changed as shown in Table 1.

EFM signals were recorded in disk sample Nos. 1 and 2 using a laser beam having a wavelength of 780 nm and a power of 7 mW. Then reproduction was carried out with a commercial CD player. Disk sample Nos. 1 and 2 permitted satisfactory reproduction at a high S/N ratio. They had a reflectivity of higher than 70% in unrecorded portions while the recorded portions had a reflectivity of less than 40% of that of the unrecorded portions.

These samples were examined by the following tests.

1) Reflectivity

EFM signals were recorded in a disk sample using a laser beam having a wavelength of 780 nm and a power of 7 mW and then reproduced by means of a commercial CD player. The reflectivity of the recorded portion at I top level was measured.

Next, the disk sample was allowed to stand for 200 hours in an environment at a temperature of 80° C. and a humidity of 80% RH before the reflectivity of the recorded portion at I top level was measured.

For each of sample Nos. 1 to 6, a normalized reflectivity was calculated on the basis of an initial reflectivity of 1.00. Evaluation was made according to the following criterion.

Pass: normalized reflectivity >0.93
Rejected: normalized reflectivity <0.93

2) C1 error

Using a commercial CD player for reproduction, the disk sample was measured for C1 error at the initial and after 200 hours in a 80° C./80% RH environment. Since the CD standard prescribes a C1 error limit of 220 counts/sec., evaluation was made according to the following criterion.

Pass: C1 error ≦220 counts/sec.
Rejected: C1 error >220 counts/sec.

3) Eye pattern disturbance

An initial eye pattern was observed by means of an oscilloscope and its disturbance was evaluated into three ratings of Pass, Fair, and Rejected according to the following criterion.

Figure 2:
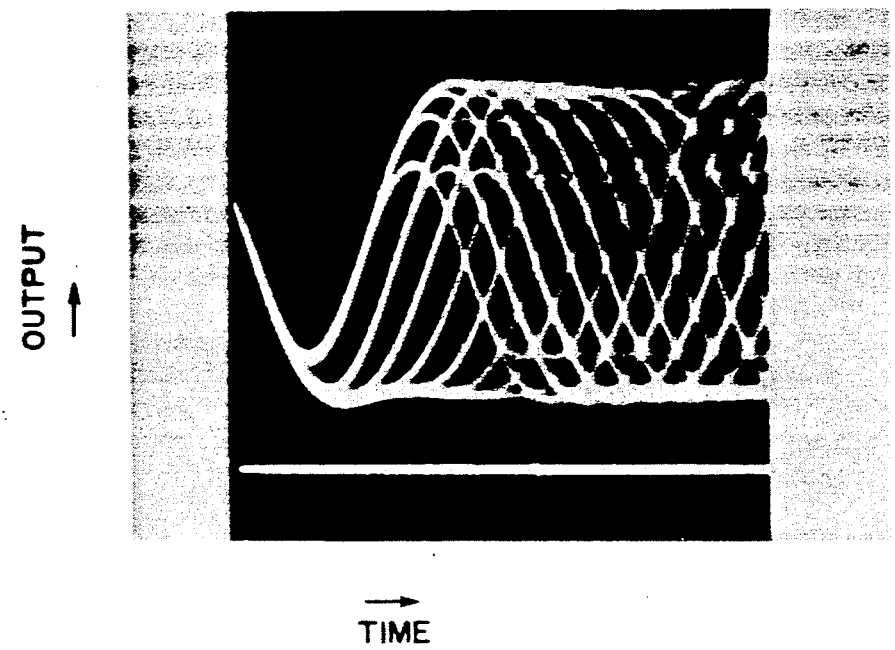
FIG. 2 is a photograph of oscilloscope waveform showing the eye pattern of an optical recording disk (sample No. 1) according to the invention.
Figure 3:
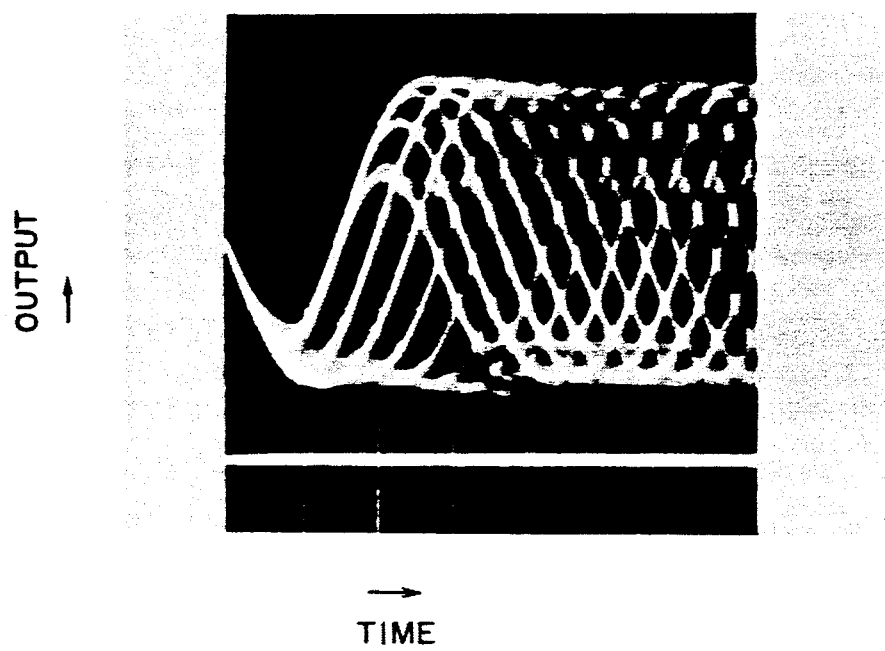
FIG. 3 is a photograph of oscilloscope waveform showing the eye pattern of a prior art optical recording disk having a reflective Au layer.

Pass: not disturbance
Fair: some disturbance at the rise of eye pattern
Rejected: disturbance at the rise of eye pattern FIGS. 2 and 3 are oscilloscopic waveforms showing the initial eye pattern of sample Nos. 1 (CuAg) and 4 (Au), respectively.

4) Jitter

Using a commercial CD player for reproduction, the disk sample was measured for jitter at the initial and after 200 hours in a 80° C/80% RH environment. A CD jitter meter model MJM-631 by Meguro K.K. was used. Evaluation was made according to the following criterion.

Pass: <30 ns
Rejected: ≧30 ns

The results are shown in Table 1.

TABLE 1

| Sample No. | Reflective layer (at %) | Reflectivity 200 hr. | C1 error Initial | C1 error 200 hr. | Eye pattern Initial | Jitter Initial | Jitter 200 hr. |
|---|---|---|---|---|---|---|---|
| 1 | $Cu_{65}Ag_{35}$ | Pass | Pass | Pass | Pass | Pass | Pass |
| 2 | $Cu_{85}Ag_{15}$ | Pass | Pass | Pass | Pass | Pass | Pass |
| 3* | Cu | Rejected | Pass | Rejected | Pass | Pass | Rejected |
| 4* | Au | Pass | Pass | Pass | Rejected | Pass | Pass |

TABLE 1-continued

| Sample No. | Reflective layer (at %) | Reflectivity 200 hr. | C1 error Initial | C1 error 200 hr. | Eye pattern Initial | Jitter Initial | Jitter 200 hr. |
|---|---|---|---|---|---|---|---|
| 5* | Ag | Rejected | Pass | Rejected | Rejected | Pass | Rejected |
| 6* | $Cu_{50}Ag_{50}$ | Pass | Pass | Pass | Rejected | Pass | Pass |
| 7 | $Cu_{60}Ag_{20}Zn_{20}$ | Pass | Pass | Pass | Pass | Pass | Pass |

*comparison

The effectiveness of the present invention is evident from the data shown in Table 1.

It was found that when the protective layer of each sample was reduced in pencil hardness, the eye pattern was somewhat distorted and the jitter was increased.

Equivalent results were obtained when samples were prepared by varying the Ag content of the reflective layer within the scope of the invention.

EXAMPLE 2

An optical recording disk sample No. 21 was prepared by starting with a polycarbonate resin substrate having a continuous spiral groove and a diameter of 120 mm and a thickness of 1.2 mm, forming a recording layer containing a dye thereon, sputtering a Cu-Au alloy on the recording layer to form a reflective layer of 1,000 Å thick, and further applying a UV-curable resin composition containing an oligoester acrylate on the reflective layer, followed by UV curing to form a protective layer of 5 μm thick.

The dye used to form the recording layer has the following structural formula.

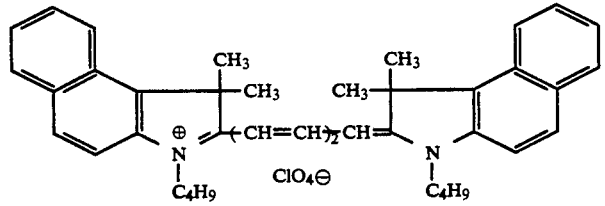

The recording layer was formed by spin coating a solution containing 3.5% by weight of the dye in diacetone alcohol while the substrate was rotated at 500 to 3,000 r.p.m. At the end of drying, the recording layer was 1,400 Å thick in groove and 1,000 Å thick on the land. The recording layer of sample No. 21 contained 90% by weight of the dye and 10% by weight of a singlet oxygen quencher. It had an index of refraction (n) of 2.6 and a coefficient of extinction (k) of 0.06.

The index of refraction (n) and coefficient of extinction (k) of the recording layer were determined by the same procedure as in Example 1 except that the solvent was diacetone alcohol and the test substrate was a polycarbonate substrate.

The reflective layer was a Cu-Au alloy thin film of the composition $Cu_{90}Au_{10}$ in atom% which was formed by sputtering the alloy under a pressure of 1.0 Pa with an input power of 11.0 W/cm². The composition of the Cu-Au alloy thin film was analyzed by inductively coupled radio-frequency plasma spectroscopy.

The protective layer was formed by spin coating a coating composition containing a radiation-curable compound and a photopolymerization sensitizer, which was the same as in Example 1.

The coating was exposed to UV radiation at 120 W/cm for 15 seconds, thereby crosslinking and curing the coating into a cured film having a pencil hardness of 2H and a thickness of 5 μm. In this way, an optical recording disk sample designated No. 21 was completed.

Sample Nos. 22 to 24 were prepared by the same procedure as No. 21 except that the reflective layer was changed as shown in Table 2.

CD signals were recorded in disk sample Nos. 21 and 22 using a laser beam having a wavelength of 780 nm and a power of 7 mW. Then reproduction was carried out with a commercial CD player. Disk sample Nos. 21 and 22 permitted satisfactory reproduction at a high S/N ratio. They had a reflectivity of higher than 70% in unrecorded portions while the recorded portions had a reflectivity of less than 40% of that of the unrecorded portions.

These samples were examined by the following tests.

1) Reflectivity

CD signals were recorded in a disk sample using a laser beam having a wavelength of 780 nm and a power of 7 mW and then reproduced by means of a commercial CD player. The reflectivity of the recorded portion at I top level was measured.

Next, the disk sample was allowed to stand for 500 hours in an environment at a temperature of 60° C. and a humidity of 90% RH before the reflectivity of the recorded portion at I top level was measured.

For each of sample Nos. 21 to 24, a normalized reflectivity was calculated on the basis of an initial reflectivity of 1.00. Evaluation was made according to the following criterion.

Pass: normalized reflectivity >0.93
Rejected: normalized reflectivity <0.93

2) C1 error

Using a commercial CD player for reproduction, the disk sample was measured for C1 error at the initial and after 500 hours in a 60° C./90% RH environment. Since the CD standard prescribes a C1 error limit of 220 counts/sec., evaluation was made according to the following criterion.

Pass: C1 error ≦220 counts/sec.
Rejected: C1 error >220 counts/sec.

3) Eye pattern disturbance

An initial eye pattern was observed by means of an oscilloscope and its disturbance was evaluated into three ratings of Pass, Fair, and Rejected according to the following criterion.

Figure 4:
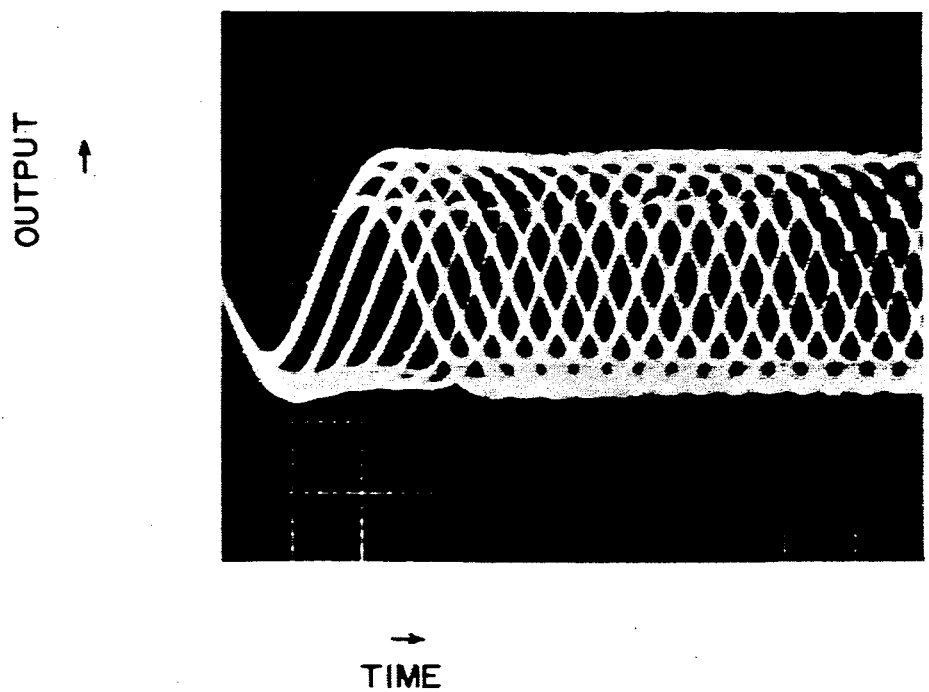
FIG. 4 is a photograph of oscilloscope waveform showing the eye pattern of another optical recording disk (sample No. 21) according to the invention.

Pass: no disturbance
Fair: some disturbance at the rise of eye pattern
Rejected: disturbance at the rise of eye pattern FIG. 4 is an oscilloscopic waveform showing the initial eye pattern of sample No. 21 (CuAu).

The results are shown in Table 2.

TABLE 2

| Sample No. | Relfective layer (at %) | Reflectivity 500 hr. | Cl error Initial | Cl error 500 hr. | Eye pattern |
|---|---|---|---|---|---|
| 21 | Cu$_{90}$Au$_{10}$ | Pass | Pass | Pass | Pass |
| 22 | Cu$_{85}$Au$_{15}$ | Pass | Pass | Pass | Pass |
| 23* | Cu | Rejected | Pass | Rejected | Pass |
| 24* | Au | Pass | Pass | Pass | Rejected |

*comparison

The effectiveness of the present invention is evident from the data shown in Table 2.

Samples Nos. 21 and 22 were also measured for jitter by means of a CD jitter meter model MJM-631, finding a jitter of less than 30 ns. The jitter of sample No. 24 was above 30 ns.

It was found that when the protective layer of each sample was a reduced in pencil hardness, the eye pattern was somewhat distorted and the jitter was increased.

Equivalent results were obtained when samples were prepared by varying the Au content of the reflective layer within the scope of the invention.

There has been described an optical recording medium which can maintain high reflectivity even after operation or storage in a high-temperature, high-humidity environment since the reflective layer has improved resistance against corrosion and humidity. As a result, the optical recording medium can effect satisfactory recording and reproduction with a minimal error rate.

In the close contact type embodiment of the optical recording medium, the high reflectivity of unrecorded portions and a great lowering of reflectivity in the pits ensure the possibility of optical recording followed by reproduction according the CD standard.

As opposed to optical recording media having a conventional reflective layer of Au thin film, the medium of the present invention provides an acceptable eye pattern and minimized jitter and is cost effective.

While we have shown and described particular embodiments of our invention, it will be obvious to those skilled in the art that various changes and modifications may be made without departing from the invention in its broader aspects.

We claim:

1. An optical recording medium, comprising:
    a substrate,
    a recording layer on the substrate, and
    a reflective layer on the recording layer in the form of a thin film of an alloy comprising Cu and from 5 atom % to less than 40 atom% of Ag.

2. The optical recording medium of claim 1 wherein the reflective layer is an alloy thin film consisting essentially of Cu and 5 atom% to less than 40 atom% of Ag.

3. The optical recording medium of claim 1 which further comprises a protective film on the reflective layer having a pencil hardness of H to 8H at 25° C.

4. The optical recording medium of claim 1, wherein said alloy contains 6 to 37 atom% of Ag.

5. An optical recording medium of claim 1 wherein said recording layer comprises a dye, and
    said reflective layer is disposed in close contact with said recording layer,
    wherein information is recorded and reproduced by directing recording light to said recording layer to form pits therein and directing reproducing light thereto.

6. The optical recording medium of claim 5, wherein said substrate is made of a resin and layer which contains decomposition products of the dye material of which said recording layer is formed, but is substantially free of the resin is present at the interface between said substrate and said recording layer where the pits are formed.

7. The optical recording medium of claim 6, wherein an empty space is formed adjacent each of the pits.

8. The optical recording medium of claim 5 wherein
    the recording and reproducing light has a wavelength in the range of from 600 to 900 nm,
    the recording layer includes an unrecorded portion having a reflectivity of at least 60% and a recorded portion having a reflectivity which is up to 60% of the reflectivity of the unrecorded portion when reproducing light is directed from the substrate side, and
    the recording layer has a coefficient of extinction k of 0.01 to 0.25 and an index of refraction n of 1.8 to 4.0 at the wavelength of the recording and reproducing light.

9. The optical recording medium of claim 8, wherein said substrate is made of a resin and layer which contains decomposition products of the dye material of which said recording layer is formed, but is substantially free of the material of which said substrate is formed is present at the interface between said substrate and said recording layer where the pits are formed.

10. The optical recording medium of claim 9, wherein an empty space is formed adjacent each of the pits.

11. The optical recording medium of claim 8, wherein said substrate is made of a resin and layer which contains decomposition products of the dye material of which said recording layer is formed, but is substantially free of the material of which said substrate is formed is present at the interface between said substrate and said recording layer where the pits are formed.

12. The optical recording medium of claim 11, wherein an empty space is formed adjacent each of the pits.

13. An optical recording medium, comprising:
    a substrate,
    a recording layer on the substrate, and
    a reflective layer on the recording layer in the form of a thin film of an alloy comprising Cu and from 5 to 80 atom% of Au.

14. The optical recording medium of claim 13 which further comprises a protective film on the reflective layer having a pencil hardness of H to 8H at 25° C.

15. The optical recording medium of claim 13, wherein the reflective layer is an alloy thin film consisting essentially of Cu and 5 to 70 atom% of Au.

16. An optical recording medium of claim 13 wherein said recording layer comprises a dye, and
    said reflective layer is disposed in close contact with said recording layer,
    wherein information is recorded and reproduced by directing recording light to said recording layer to form pits therein and directing reproducing light thereto.

17. The optical recording medium of claim 16 wherein
the recording and reproducing light has a wavelength in the range of from 600 to 900 nm,
the recording layer includes an unrecorded portion having a reflectivity of at least 60% and a recorded portion having a reflectivity which is up to 60% of the reflectivity of the unrecorded portion when reproducing light is directed from the substrate side, and
the recording layer has a coefficient of extinction k of 0.03 to 0.25 and an index of refraction n of 1.8 to 4.0 at the wavelength of the recording and reproducing light.

18. The optical recording medium of claim 16, wherein said substrate is made of a resin and layer which contains decomposition products of the dye material of which said recording layer is formed, but is substantially free of the resin material of which said substrate is formed is present at the interface between said substrate and said recording layer where the pits are formed.

19. The optical recording medium of claim 18, wherein an empty space is formed adjacent each of the pits.

* * * * *